Patented June 1, 1954

2,680,058

UNITED STATES PATENT OFFICE 2,680,058

PRESERVATION OF PETROLEUM IN STORAGE

Rhett G. Harris and Raymond J. Strawinski, Long Beach, Calif., assignors to Texaco Development Corporation, New York, N. Y., a corporation of Delaware No Drawing. Application April 27, 1948, Serial No. 23,625

3 Claims. (Cl. 21—2.5)

This invention relates to the preservation of petroleum, petroleum products, and like substances in storage, and more particularly to the inhibition of microbial or bacterial action on petroleum or other materials susceptible to such action in storage tanks.

In petroleum and petroleum product storage facilities such as storage tanks, and in the storage of some bituminous materials, organic compounds, hydrocarbon derivatives, and other substances susceptible to metabolism or other decomposition by microorganisms, a water layer is usually provided in the bottom of the tank to insure against loss by leakage, the water being replenished as found necessary. Microorganisms such as bacteria, yeast, molds, actinomyces, etc. are almost always found in this water, the bacteria usually being of a type which apparently functions at the interface between the stored material and water to metabolize the material or constituents thereof. In the case of some materials, such as petroleum hydrocarbons, this apparent metabolism results in some loss of the petroleum or petroleum product but is more undesirable in other respects in that it causes discoloration of the petroleum, the formation of hydrogen sulfide and undesirable gummy substances, the formation of peroxides which effect oxidation, and the formation of many other undesirable compounds such as acids. Obviously, all this is harmful to the tank structure as well as the petroleum since such tanks are usually formed of metal. Discoloration in the case of petroleum is highly undesirable since in some cases as with so-called white distillates or kerosine fractions, the discoloration has been such as to require a complete re-refining of the oil. Where additives are present in the petroleum as is usually the case with gasoline and lubricating oils, the formation of the gummy substances may represent loss of such additives or undesirable conversions thereof.

It is an object of this invention to provide a novel method of preserving such stored products against such microbial action.

Another object of the invention is the provision of a novel method of protecting such storage facilities against corrosion and deterioration.

Other objects and advantages of the invention will become apparent from the following description of the invention taken in connection with the accompanying claims.

Briefly described, the present invention involves the maintenance of the water layer of storage tanks containing petroleum, petroleum products, organic compounds, hydrocarbon derivatives, and like substances in a condition capable of inhibiting microbial action over a sustained period of time, the condition being such that neither the stored substance or the material of which the tanks is constructed is affected thereby. More specifically the invention involves the maintenance of the water layer in a predetermined pH range, and with a toxic ion content, that range and the toxic ions being such as to inhibit the growth of microorganisms and microbial action in the water and consequently prevent any undesirable effect on the stored material or the tank structure.

In practicing the invention, either the water layer already present in the storage tank, or like facility, or water to be used as the water layer is brought to a pH above 8.5, preferably in the range of approximately 9 to 12, and an ion capable of inhibiting bacterial action is added thereto. This may be accomplished by the addition of a single agent or two agents. Borax is an example of such a single agent, a saturated solution of borax having a pH of from 8.7 to 9.0 and furnishing borate and pyroborate ions which are apparently toxic to the microorganisms involved or at least sufficiently toxic to prevent or inhibit their growth and any subsequent undesirable effects on the stored substance. Obviously the pH may be altered by another alkaline reagent and the toxic ion introduced in an entirely different compound.

While borax has been found highly satisfactory as an agent capable of supplying the required toxic anion, other compounds such as the other tetraborates of sodium, sodium metaborate, and sodium perborate can be used. The lithium and potassium derivative of the boric acids and those ammonium salts which are stable as well as the acids such as orthoboric acid and tetraboric acid may also be used as well as boric acid anhydride.

It is preferred to charge the compound or compounds to the water prior to admitting the water to the tank. However, the water can be treated by charging the agent or agents at the bottom of the tank if the latter be on or close to the ground level or by inserting a pipe down through the contained material into the water layer if the bottom of the tank is not accessible.

Compounds of the type listed above, especially borax, are preferred because of their relatively low cost, their relative inertness with respect to the contained liquid and any additives that may be therein, their preferential solubility in the water layer, their stability and their ability to provide both the desired pH and the desired toxic anions. It is to be understood that some of the above-mentioned compounds may not be capable of use in all cases. For instance, fuel oils and lubricating oils may contain certain additives that are sensitive to certain of these compounds in which case other compounds can be used. In some instances, it may be desirable to saturate the water layer with the additive or additives present in the stored material whereby the alkali or the toxic anion will act on that portion of the additive in preference to that portion in the stored material.

As an illustration of the excellent results obtained by the use of both the high pH and the toxic ion, tests have been conducted with typical hydrocarbons such as crude oil, straight-run gasoline and naphtha layered over a typical tap water having a pH of 7.4, the same water adjusted to a pH of 9.0 with sodium hydroxide, and the same water saturated with borax, the pH of the latter being 8.7 to 9.0. All the waters were inoculated with a solution containing a heavy growth of bacteria over which crude oil had been stored to insure activity of the bacteria toward such a substrate. The tests were conducted at room temperatures.

The untreated water samples began to show growth within 24 to 48 hours. With the hydroxide treated water, the sample developed a marked turbidity at the end of five days. The naphtha had a sour odor and the gasoline developed a pink color. All the observations indicated microbial action on the oils. No growth or turbidity was evident in the borax samples, even after a two weeks incubation period, thus indicating that any bacterial action on the hydrocarbons was entirely inhibited. No change in the physical characteristics of the oils was observed.

It will be seen therefore that the present invention with its raising of the pH and addition of an ion toxic to the microorganism effectually prevents any deterioration of the liquid product by reason of microbial action. The steps involved are exceedingly simple and the process is very economical.

The term "petroleum" as used herein is intended to include crude oil and products made therefrom such as gasoline, lubricating oils and the like as well as other hydrocarbons that are susceptible to deterioration in storage.

Obviously many modifications and variations of the invention as hereinabove set forth may be made without departing from the spirit and scope thereof and only such limitations should be imposed as are indicated in the appended claims.

We claim:

1. In the storage of petroleum susceptible to microbial action over bottom water layers, the improvement which comprises preserving said substances against discoloration, oxidation, metabolism and like deterioration effected by microorganisms in the water layer by maintaining said water layer in the alkaline range at a pH of at least 8.5 and maintaining said water layer charged with a substance capable of being ionized therein to produce a toxic boron-containing anion.

2. In the storage of petroleum susceptible to microbial action over bottom water layers, the improvement which comprises preserving said substances against discoloration, oxidation, metabolism and like deterioration effected by microorganisms in the water layer by maintaining said water layer at a pH between 9 and 10 and maintaining said water layer charged with a substance capable of being ionized therein to produce a toxic boron-containing anion.

3. In the storage of petroleum susceptible to microbial action over bottom water layers, the improvement which comprises preserving said substances against discoloration, oxidation, metabolism and like deterioration effected by microorganisms in the water layer by maintaining said water layer substantially saturated with borax.

References Cited in the file of this patent

UNITED STATES PATENTS

| Number | Name | Date |
| --- | --- | --- |
| 372,861 | Morgan | Nov. 8, 1887 |
| 629,411 | Wilson | July 25, 1899 |
| 2,119,240 | Lyons | May 31, 1938 |
| 2,137,727 | Quirke | Nov. 22, 1938 |
| 2,141,049 | Skeen | Dec. 20, 1938 |
| 2,296,523 | Henry | Sept. 22, 1942 |
| 2,457,959 | Walker | Jan. 4, 1949 |

OTHER REFERENCES

"Hackh's Chemical Dictionary," third edition, by Julius Grant (The Blakiston Co., Philadelphia, Pa.), 1944, see page 138 under Borax.